US012744868B2

(12) United States Patent
Jun

(10) Patent No.: US 12,744,868 B2
(45) Date of Patent: Sep. 22, 2026

(54) VEHICLE VIDEO RECORDING METHOD AND VEHICLE VIDEO RECORDING SYSTEM

(71) Applicants: HYUNDAI MOTOR COMPANY, Seoul (KR); KIA CORPORATION, Seoul (KR)

(72) Inventor: Sung Hwan Jun, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/944,840

(22) Filed: Nov. 12, 2024

(65) Prior Publication Data

US 2025/0385991 A1 Dec. 18, 2025

(30) Foreign Application Priority Data

Jun. 17, 2024 (KR) ........................ 10-2024-0078370

(51) Int. Cl.
*H04N 7/18* (2006.01)
*G06V 20/58* (2022.01)

(52) U.S. Cl.
CPC ............. *H04N 7/188* (2013.01); *G06V 20/58* (2022.01)

(58) Field of Classification Search
CPC ............................... H04N 7/188; G06V 20/58
See application file for complete search history.

(56) References Cited

U.S. PATENT DOCUMENTS

| | | | | |
|---|---|---|---|---|
| 7,650,058 | B1 * | 1/2010 | Garoutte | G08B 13/19604 382/104 |
| 2005/0068429 | A1 * | 3/2005 | Kreiner | G08B 13/19669 386/E5.064 |
| 2009/0060276 | A1 * | 3/2009 | Yu | G08B 13/19608 382/103 |
| 2016/0042621 | A1 * | 2/2016 | Hogg | H04N 23/64 348/155 |
| 2020/0327682 | A1 * | 10/2020 | Nater | G06V 10/255 |
| 2022/0239868 | A1 * | 7/2022 | Lee | H04N 23/65 |
| 2022/0345669 | A1 * | 10/2022 | McRae | G06V 40/23 |
| 2025/0217945 | A1 * | 7/2025 | Ramesh | H04N 23/64 |

* cited by examiner

*Primary Examiner* — Michael Lee
(74) *Attorney, Agent, or Firm* — MCDONNELL BOEHNEN HULBERT & BERGHOFF LLP

(57) ABSTRACT

Disclosed is a vehicle video recording method to perform video recording upon detecting a motion of an object around a vehicle in a parked state. The method for controlling the vehicle video recording system includes collecting motion information of a first object with a continuous motion in an area for a first set time; generating a static motion area based on the motion information collected during the first set time, and in response to the motion of the first object being a motion in the static motion area, turning off a video recording function for the motion of the first object.

20 Claims, 7 Drawing Sheets

| Motion occurrence distance | Second set time |
|---|---|
| Vehicle ~ A (m) | X sec |
| A ~ B (m) | Y sec |
| B ~ C (m) | Z sec |

FIG. 4

VEHICLE VIDEO RECORDING METHOD AND VEHICLE VIDEO RECORDING SYSTEM

CROSS REFERENCE TO RELATED APPLICATION(S)

This application claims the benefit of Korean Patent Application No. 10-2024-0078370, filed on Jun. 17, 2024, which is hereby incorporated by reference as if fully set forth herein.

TECHNICAL FIELD

The present disclosure relates to a vehicle video recording method and a vehicle video recording system.

BACKGROUND

A video recording device for a vehicle refers to a device configured to record videos of, for example, a vehicle that is traveling or parked.

The video recording device may generally be referred to as a driving video recording device because it is intended mainly to acquire videos or images of an accident or the like that may occur during driving.

To acquire videos or images, the video recording device may include a controller, a memory for storing videos or images, and a camera for capturing and recording videos or images.

In general, the video recording device may store a video of the surroundings of a vehicle while the vehicle is traveling, along with data on driving of the vehicle at a time corresponding to the video and, when the occurrence of a set event is detected even while the vehicle is parked, record a video according to the already input settings.

The video recording device (or system) for a vehicle, also referred to as a black box (or a dash camera), was initially provided (e.g., only) as an external device, but has recently been embedded as a built-in device in a vehicle before the vehicle is released from a factory.

Such a built-in camera (or simply a built-in cam) may be more effective than the external one in terms of access to driving data of a host vehicle and association with other controllers and may thus be expected to be further increasingly used.

The video recording device (or system) may perform always-on recording and event-based recording while a vehicle is traveling and parked, and may interwork with an audio-video-navigation (AVN) system to configure the system and view stored videos or images.

The event-based recording may record and store videos and images when an impact of a certain magnitude or greater is detected by an impact detection sensor. The always-on recording may continue to record and store videos or images regardless of the occurrence of such an impact event.

An always-on recording mode may benefit from (e.g., require) a continuous power supply to the camera and the controller, using (e.g., requiring) a great battery consumption, and therefore, the duration of the always-on recording mode in a parked state may be limited.

Therefore, a technical solution to extend the duration of the always-on recording mode despite a limited battery capacity for a recording mode in the parked state would be preferred.

SUMMARY

An object of the present disclosure is to solve at least one of the issues described above.

An object of the present disclosure is to provide a method for efficient video recording with reduced battery consumption by performing recording in a situation where video recording is beneficial (e.g., highly required) in an always-on recording mode in a parked situation.

Accordingly, an embodiment of the present disclosure proposes a method of detecting a motion of an object around a vehicle and recording videos based on the detected motion.

Further, an embodiment of the present disclosure proposes a method of effectively detecting a motion from a static object that is continuously moving (e.g., a tree swaying in the wind or the like) around the vehicle based on the nature of the motion, thereby preventing repeated unnecessary recording.

The embodiments of the present disclosure are to provide a vehicle video recording method and a vehicle video recording system that may distinguish a motion of a static object around a vehicle and turn off a video recording function when the motion of the static object is determined, thereby preventing unnecessary video recording.

The technical objects to be achieved by the present disclosure are not limited to those described above, and other technical objects not described above may also be clearly understood by a person of ordinary skill in the art from the following description.

According to an embodiment of the present disclosure, there is provided a method for controlling a vehicle video recording system of a vehicle, the method comprising turning on a video recording function of the vehicle video recording system in response to a motion of at least one object around the vehicle being detected via at least one sensor mounted at the vehicle while the vehicle is in a parked state, collecting motion information of a first object which makes a continuous motion, for a first set time, generating a static motion area based on the motion information collected during the first set time, and in response to the motion of the first object being maintained in the static motion area, turning off the video recording function for the motion of the first object.

For example, the motion information may include at least one of a velocity vector of the first object, a motion occurrence distance at which the motion occurs from the vehicle, and a three-dimensional (3D) coordinate.

For example, the generating of the static motion area may include generating, as the static motion area, an area including an outermost end 3D coordinate of the motion information collected during the first set time.

For example, the static motion area may be in the form of a 3D hexahedron.

In addition, the vehicle video recording method may further include determining whether a motion of the first object is detected outside the static motion area or a motion of a second object is detected, and when the motion of the first object is detected outside the static motion area or the motion of the second object is detected, turning on the video recording function.

In this case, the determining whether the motion of the first object is detected outside the static motion area or the motion of the second object is detected may be performed during a second set time.

For example, the first set time and/or the second set time may be set differently depending on a motion occurrence distance at which the motion occurs, or may be proportional to the motion occurrence distance.

For example, the vehicle video recording method may further include determining whether a sensitivity auto-adjustment function is enabled when the motion of the first object is not detected outside the static motion area nor the motion of the second object is detected during the second set time.

In this case, the vehicle video recording method may further include receiving, through a user menu, an input about whether to enable the sensitivity auto-adjustment function.

For example, the vehicle video recording method may further include excluding the static motion area from a detection range when the sensitivity auto-adjustment function is enabled.

According to an embodiment of the present disclosure, there is provided a vehicle video recording system for recording videos upon detecting a motion of an object around a vehicle in a parked state, the vehicle video recording system comprising a motion detection sensor configured to detect a motion of an object around the vehicle, a camera configured to record a video of surroundings of the vehicle when the motion is detected through the motion detection sensor, a memory configured to store the recorded video; and a controller, wherein the controller is configured to: collect motion information of a first object which makes a continuous motion, for a first set time, generate a static motion area based on the motion information collected during the first set time, and in response to the motion of the first object being maintained in the static motion area, turn off a video recording function for the motion of the first object.

For example, the motion information may include at least one of a velocity vector of the first object, a motion occurrence distance at which the motion occurs from the vehicle, and a 3D coordinate.

For example, the controller may be configured to generate, as the static motion area, an area including an outermost end 3D coordinate of the motion information collected during the first set time.

For example, the controller may be configured to determine whether a motion of the first object is detected outside the static motion area or a motion of a second object is detected, and when the motion of the first object is detected outside the static motion area or the motion of the second object is detected, turn on the video recording function.

For example, the controller may be configured to determine whether the motion of the first object is detected outside the static motion area or the motion of the second object is detected during a second set time.

In this case, the first set time and/or the second set time may be set differently depending on a motion occurrence distance at which the motion occurs.

For example, the controller may be configured further to determine whether a sensitivity auto-adjustment function is enabled when the motion of the first object is not detected outside the static motion area nor the motion of the second object is detected during the second set time.

For example, the controller may be configured to receive, through a user menu, an input about whether to enable the sensitivity auto-adjustment function.

For example, when the sensitivity auto-adjustment function is enabled, the controller may be configured to exclude the static motion area from a detection range of the motion detection sensor.

According to embodiments of the present disclosure described herein, recording may be performed based on whether it is a situation where video recording is beneficial (e.g., highly needed) in an always-on recording mode while a vehicle is parked, and thus efficient video recording with reduced battery consumption may be achieved.

Further, according to embodiments of the present disclosure described herein, the motion of objects around a vehicle may be detected and video recording may be performed accordingly, and thus efficient video recording may be achieved.

Further, according to embodiments of the present disclosure described herein, motion detection based on a continuous movement of a static object (e.g., a tree swaying in the wind) around a vehicle may be effectively performed based on the nature of a motion, and thus repeated unnecessary recording may be prevented.

Further, according to embodiments of the present disclosure described herein, a motion of a static object around a vehicle may be identified and, when the motion of the static object is detected, a video recording function may be turned off, and thus unnecessary video recording may be prevented.

The effects that can be achieved from the present disclosure are not limited to those described above, and other effects not described above may also be clearly understood by a person of ordinary skill in the art from the following description.

BRIEF DESCRIPTION OF THE DRAWINGS

FIG. 4 is a diagram illustrating a second set time different by distance according to an embodiment of the present disclosure.

DETAILED DESCRIPTION

Figure 1:
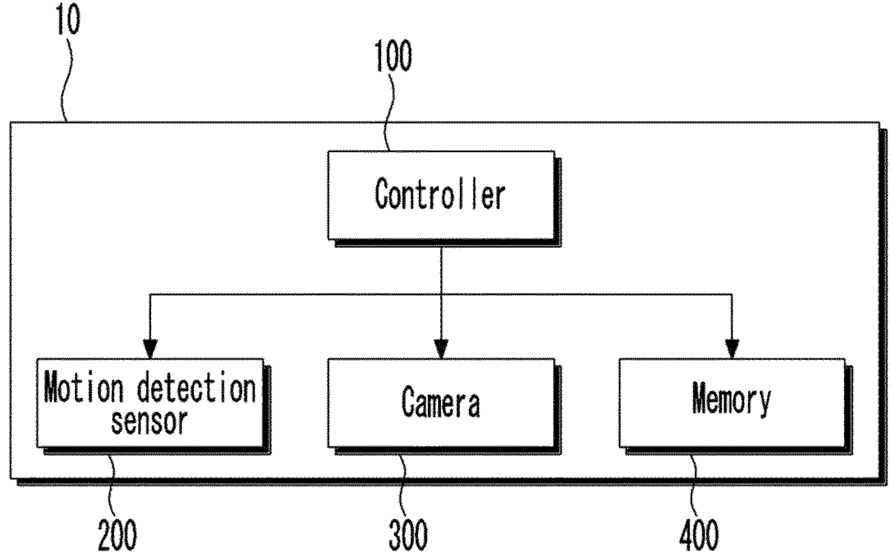
FIG. 1 is a block diagram illustrating a vehicle video recording system according to an embodiment of the present disclosure.

Hereinafter, embodiments of the present disclosure will be described in detail with reference to the accompanying drawings. The embodiments are not construed as limited to the disclosure and should be understood to include all changes, equivalents, and replacements within the idea and the technical scope of the disclosure.

The terminology used herein is intended to describe particular embodiments (e.g., only) and is not intended to limit the disclosure. The singular forms "a," "an," and "the" are intended to include the plural forms as well, unless the context clearly indicates otherwise. It is to be further understood that the terms "comprises/comprising" and/or "includes/including" used herein specify the presence of stated features, integers, steps, operations, elements, and/or components, but do not preclude the presence or addition of one or more other features, integers, steps, operations, elements, components and/or groups thereof.

As used herein, the terms "module," "unit," and/or "-er/or" may refer to a unit that processes or handle at least one function or operation, which may be implemented in hardware or software or a combination thereof.

Although terms including ordinal numbers, such as "first," "second," and the like, may be used herein to describe various elements, the elements are not limited by these terms. These terms are (e.g., only) used to distinguish one element from another.

The term "and/or" is used to include any combination of multiple items that are subject to it. For example, "A and/or B" may include all three cases, for example, "A," "B," and "A and B."

When an element is described as "coupled" or "connected" to another element, the element may be directly coupled or connected to the other element. However, it is to be understood that another element may be present therebetween. In contrast, when an element is described as "directly coupled" or "directly connected" to another element, it is to be understood that there are no other elements therebetween.

Unless otherwise defined, all terms including technical and scientific terms used herein have the same meaning as commonly understood by one of ordinary skill in the art to which the present disclosure pertains. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

In addition, the term "unit," "control unit," "control device," or "controller" is merely a widely used term for naming an element that controls a specific function, and does not mean a generic functional unit. For example, each controller may include a communication device that communicates with another controller or a sensor to control a function assigned thereto, a memory that stores an operating system (OS), a logic command, input/output information, and the like, and one or more processors that perform determination, calculation, computation, decision, and the like that are configured to control a function assigned thereto.

Meanwhile, a processor may include a semiconductor integrated circuit and/or electronic devices that perform at least one or more of comparison, determination, computation, operations, and decision to achieve programmed functions. The processor may be, for example, any one or a combination of a computer, a microprocessor, a central processing unit (CPU), an application-specific integrated circuit (ASIC), an electronic circuitry, and a logic circuitry.

In addition, computer-readable recording media (or simply memory) include all types of storage devices that store data readable by a computer system. The storage devices may include at least one type of, for example, flash memory, hard disk, micro-type memory, card-type (e.g., secure digital (SD) card or extreme digital (XD) card) memory, random-access memory (RAM), static RAM (SRAM), read-only memory (ROM), programmable ROM (PROM), electrically erasable PROM (EEPROM), magnetic RAM (MRAM), magnetic disk, or optical disc.

This recording medium may be electrically connected to the processor, and the processor may load and record data from the recording medium. The recording medium and the processor may be integrated or may be physically separated.

Hereinafter, embodiments of the present disclosure will be described in detail with reference to the accompanying drawings.

FIG. 1 is a block diagram illustrating a video recording system for a vehicle according to an embodiment of the present disclosure.

According to an embodiment of the present disclosure, a video recording system 10 for a vehicle may include a motion detection sensor 200 configured to detect a motion of an object around a vehicle, a camera 300 configured to capture and record an image (also "video" herein) of the surroundings of the vehicle when the motion of the object is detected, a memory 400 in which the captured video is stored, and a controller 100.

The motion detection sensor 200 may be, for example, a radar, a lidar, or the like, and may detect a motion of a nearby object and measure information about the motion. However, the type of the motion detection sensor 200 is not limited thereto.

The radar may be disposed at any suitable position outside the vehicle to detect objects present before or behind the vehicle or on the sides of the vehicle. The radar may be implemented as a pulse radar or a continuous wave radar based on the principle of radar propagation. The continuous wave radar may be implemented in a frequency-modulated continuous wave (FMCW) radar type or a frequency-shift keying (FSK) type depending on a signal waveform.

The lidar may be disposed at any suitable position outside the vehicle to detect objects present before or behind the vehicle or on the sides of the vehicle. The lidar may detect an object, and may detect a position of the detected object, a distance from the detected object, and a relative velocity of the detected object.

The camera 300 may be disposed at any suitable position outside the vehicle to acquire an image (also "video" herein) of the outside of the vehicle. The camera 300 may be, for example, a mono camera, a stereo camera, an around view monitoring (AVM) camera, or a 360-degree camera.

The camera 300 used in the video recording system 10 may be an external camera, which is also referred to as a black box (or a dash cam), or may be an internal camera (or a "built-in cam") that is already built into the vehicle before the vehicle is released from a factory.

The controller 100 may receive detection information acquired by the motion detection sensor 200 and transmit a video-capturing signal to the camera 300, and may perform necessary overall control for the video recording system 10 by, for example, deleting or storing a video captured by the camera 300 from or in the memory 400.

The controller 100 may also receive various settings from a user through a user menu. The user menu may be provided through an audio-video-navigation (AVN) screen in the vehicle.

According to an embodiment, the video recording system 10 may essentially perform a mechanism in which, when the motion detection sensor 200 detects a motion of an object around the vehicle, the camera 300 may record a video of the surroundings of the vehicle for a set time and store the video in the memory 400. This may also be a mechanism for motion detection recording while the vehicle is parked.

Accordingly, a recording may be performed even in a situation where the recording is unnecessary, for example, a situation where there is the same image or video of the same pattern of motion of a static object such as a tree swaying by the wind.

Thus, to address such recordings, the present disclosure provides a method of collecting motion detection data having a certain pattern of motion of a static object, generating a three-dimensional (3D) area in which the motion occurs, and performing video recording based on the motion detected from the object (e.g., only) when the object moves out of the 3D area.

Figure 2:
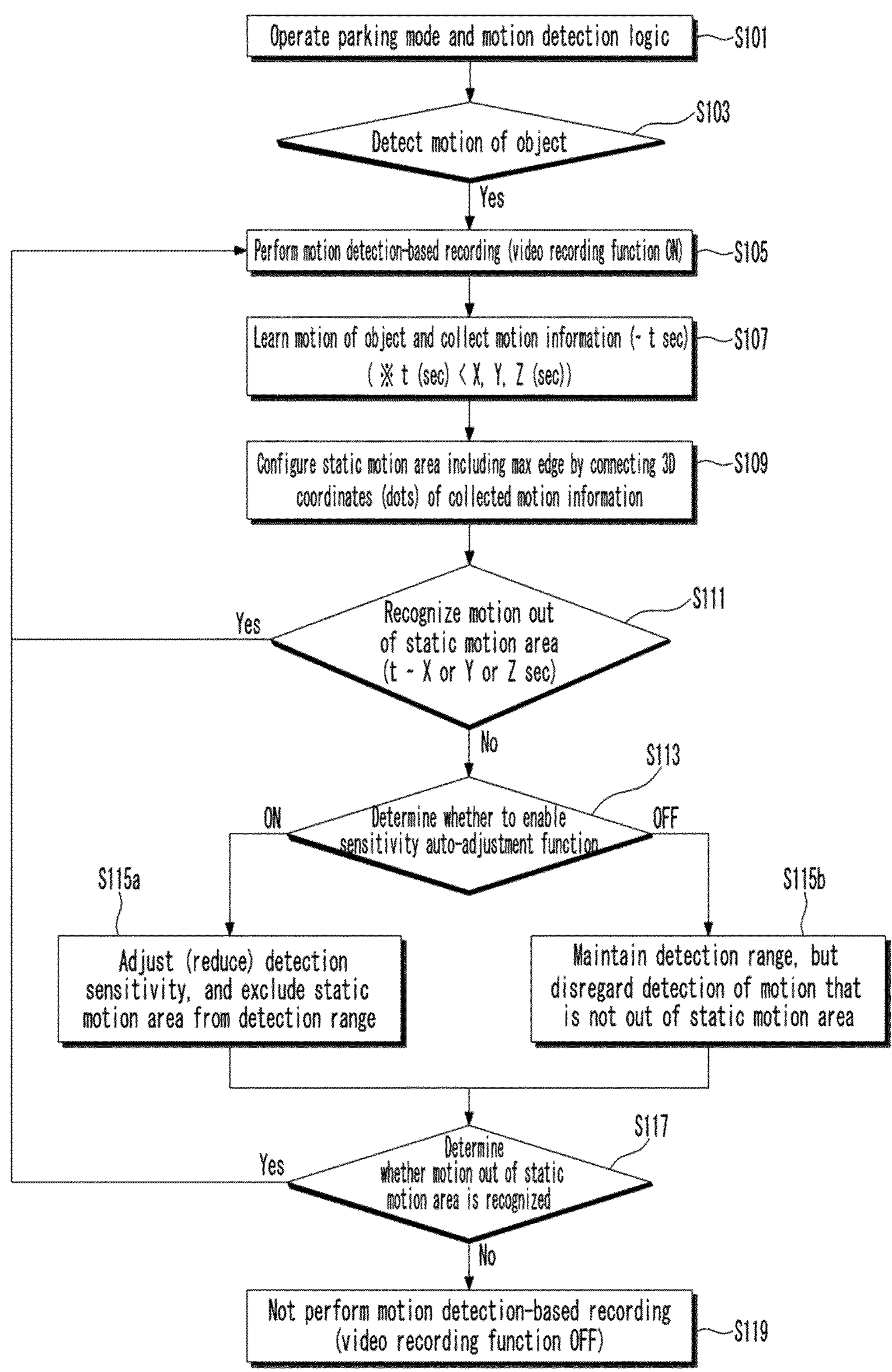
FIG. 2 is a flowchart illustrating a vehicle video recording method according to an embodiment of the present disclosure.

This operating mechanism of a video recording device for a vehicle according to an embodiment of the present disclosure will be described below in detail with reference to FIG. 2.

First, when the vehicle is parked, a parking mode and a motion detection logic may be operated in step S101.

The parking mode may refer to a mode in which, when the vehicle is at a gear stage of P (park), a situation around the vehicle is detected, and recording is performed. The parking mode may be divided into an always-on recording mode and an event-based recording mode (also an "event recording mode" herein). According to an embodiment of the present disclosure, recording may be performed (e.g., only) when a motion of an object around the vehicle is detected in the always-on recording mode, and recording may be performed (e.g., only) when an impact is applied to the vehicle in the event recording mode. In this case, a motion detection function may be enabled as a user selects it from a user settings menu provided through the AVN screen.

In this case, a motion detection logic may operate in a process of steps S101 through at least S115. The motion detection logic may operate by default concurrent with the entry into the parking mode, as opposed to the preceding description.

A first step of the motion detection logic is to detect an occurrence of a motion of an object around the vehicle in step S103. The motion of the object around the vehicle may be detected by the motion detection sensor 200.

In the present disclosure, an object that is fixed somewhere and repeats a constant motion, such as, for example, a tree swaying in the wind or a bell hanging from the ceiling, is referred to as a static object.

When the motion detection sensor 200 recognizes a motion of an object within a certain radius of the vehicle, the controller 100 may transmit a recording command to the camera 300 and allow the camera 300 to perform recording (e.g., turn on the video recording function) accordingly in step S105.

Even for a static object, recording may be performed (e.g., the video recording function may be turned on) when a motion is initially detected. The video recording based on the initial detection of the motion of the static object may be performed for a set period of time, and video recording based on subsequent detection of a motion of the object may not be performed any longer unless the motion is detected to be out of a static motion area, as described later.

To this end, the controller 100 may collect motion information of the object from the motion detection sensor 200 during a first set time t in step S107.

The motion information may include, but is not limited to, a velocity vector of the object, a motion occurrence distance at which the motion occurs from the vehicle, and 3D coordinates at which the motion occurs.

The velocity vector may include information about, for example, 3D coordinates for start and end points of the motion, a time at which the motion has occurred, and a moving speed.

In this case, information about a distance between the vehicle and a motion occurrence point at which the motion occurs, e.g., the motion occurrence distance, may also be collected. The motion occurrence distance may be a reference based on which the first set time t and a second set time (X, Y, Z) are determined, as described later. For example, when motion detection data of an object includes data of a plurality of points, a distance between the object (e.g., a motion occurrence point) and the vehicle may be determined as an average distance of the plurality of points.

The first set time may refer to a time for which the controller 100 collects the motion information of the object, and the first set time may vary depending on the motion occurrence distance and may increase in proportion to the motion occurrence distance. The first set time may have a smaller value than that of the second set time (e.g., t (sec)<X, Y, Z (sec)). The first set time and the second set time may be expressed in the units of seconds (sec) or minutes (min).

When the first set time t is reached, the controller 100 may generate, as a static motion area, an area including 3D coordinates of an outermost end in the motion information collected during the first set time in step S109.

The motion information of the object collected during the first set time t may include 3D coordinate information of different positions for each of time frames. The controller 100 may generate the static motion area based on the outermost 3D coordinates such that all the collected 3D coordinates are included.

Figure 3A:
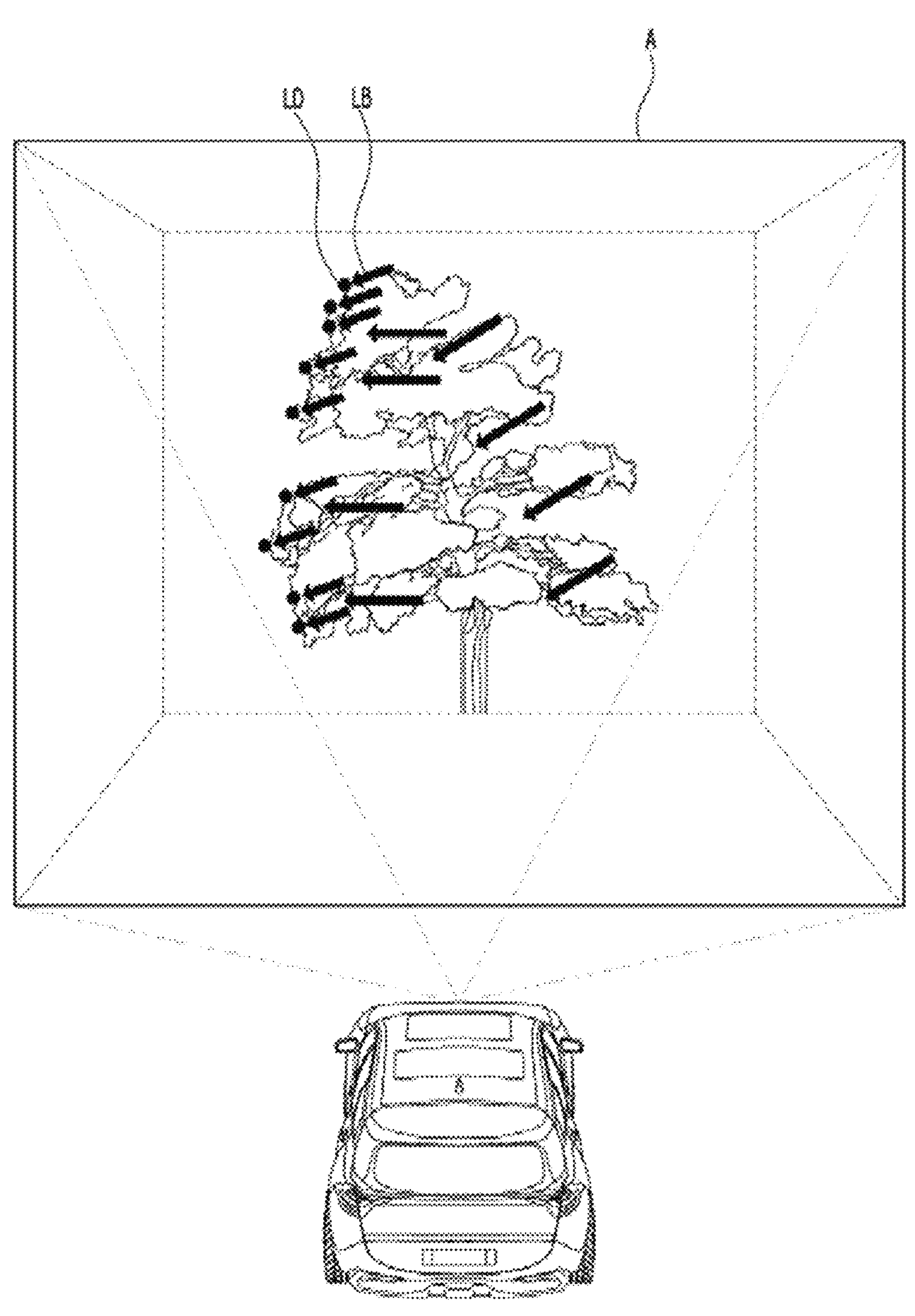
FIGS. 3A, 3B, and 3C are diagrams illustrating a process of generating a static motion area according to an embodiment of the present disclosure.
Figure 3B:
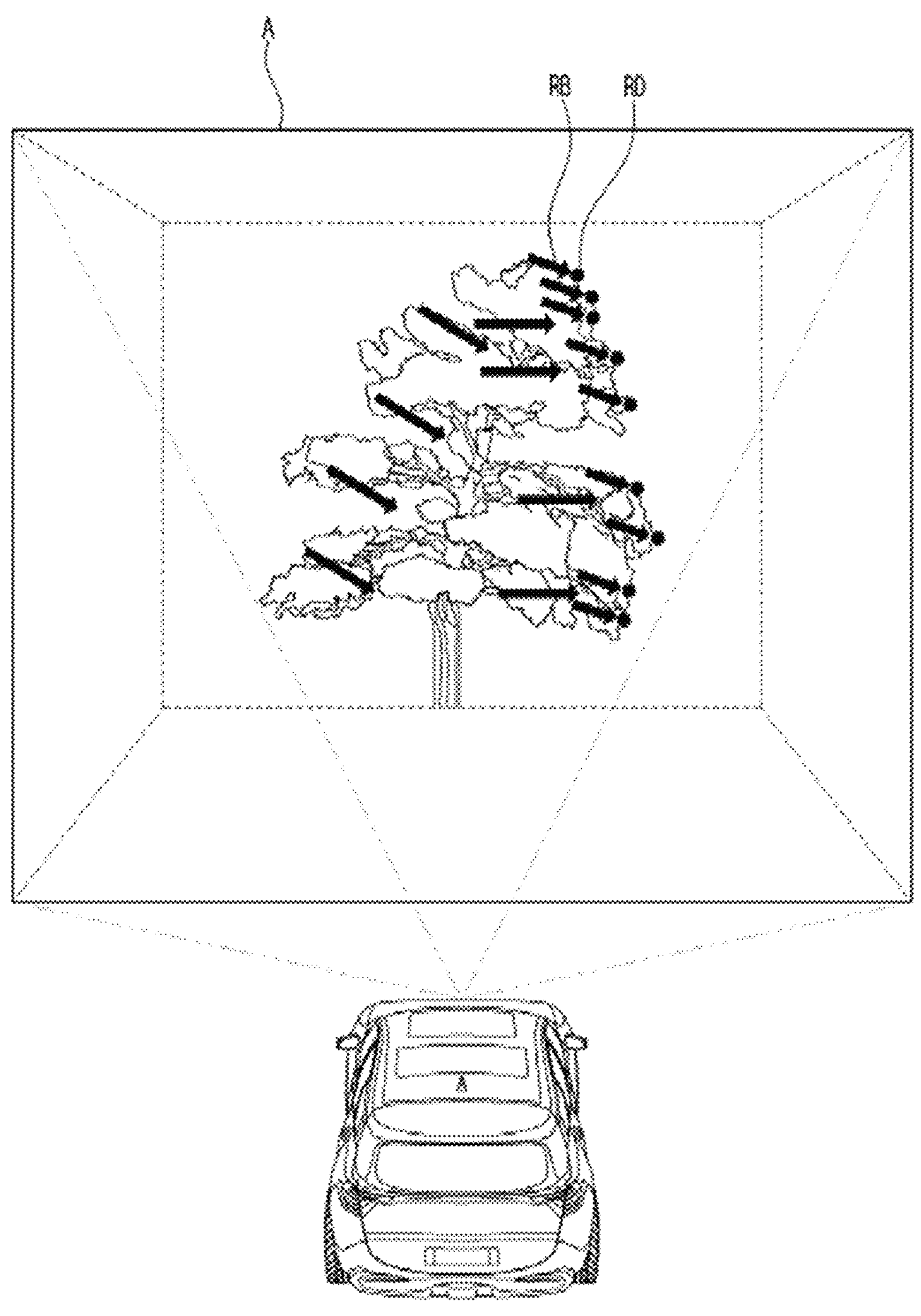
Figure 3C:
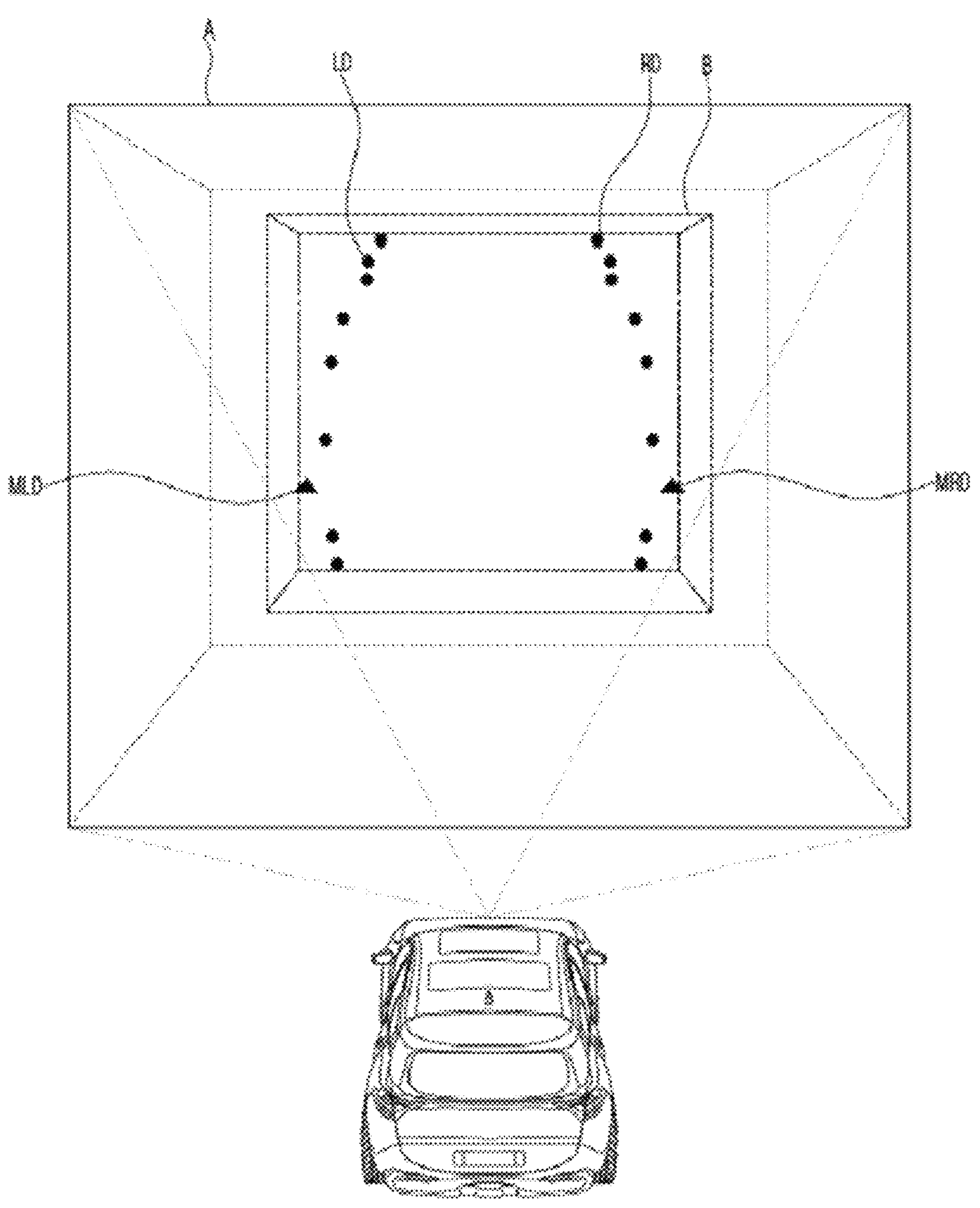

The step of generating the static motion area is described below with reference to FIGS. 3A through 3C. FIGS. 3A and 3B illustrate how a vehicle detects a tree swaying from side to side around the vehicle and collects motion information of the tree. As a motion of the tree is detected, initial video recording may be performed, and the motion information of the tree may be subsequently collected. In this case, the motion detection of the tree may acquire a plurality of motion information (e.g., including coordinates and velocities corresponding to a plurality of points) from a specific area within a sensor detection range A.

In a case where a first motion of the tree moving is leaning to the left (refer to FIG. 3A), a plurality of velocity vectors LB heading leftward may be measured. In this case, 3D coordinate values LD of a leftmost end (e.g., edge end) of the velocity vectors LB may be stored in the controller 100.

In a case where a second motion of the tree moving is leaning to the right (refer to FIG. 3B), a plurality of velocity vectors RB heading rightward may be measured. In this case, 3D coordinate values RD of a rightmost end (e.g., edge end) of the velocity vectors RB may be stored in the controller 100.

Although (e.g., only) the left and right directions are illustrated, the 3D coordinate values may also be collected in all the directions, such as, upward, downward, leftward, and rightward, in the same way as described above.

The above process may continue by the first set time t. Based on the 3D coordinate values LD and RD of the edge ends of the velocity vectors collected during the first set time t, a static motion area B may be generated to include all the 3D coordinate values LD and RD, as shown in FIG. 3C.

The static motion area B may be in the form of a 3D hexahedron. In this case, the static motion area B of a 3D hexahedral shape may be generated based on outermost 3D coordinates MLD and MRD among the 3D coordinate values LD and RD of the edge ends. As the static motion area B is generated based on the outermost 3D coordinates MLD and MRD, the static motion area B may include all the 3D coordinate values LD and RD collected during the first set time t.

The controller 100 may then detect an occurrence of a motion that is out of the static motion area, within the static motion area, by the second set time in step S111.

The second set time may be a reference time for determining whether to reduce the detection range depending on whether a sensitivity auto-adjustment function is enabled or not. The second set time may vary depending on the motion occurrence distance and may increase in proportion to the motion occurrence distance. This is to be described with reference to FIG. 4. Referring to FIGS. 4, A, B, and C represent motion occurrence distances expressed in the units of meters (m), and A<B<C. That is, from A to C, a distance between the vehicle and a position at which a motion occurs may increase, and the second set time may be set accordingly to X, Y, and Z, respectively, such that X<Y<Z. This is because, as the distance increases, determining whether it is a static object may be challenging.

After the generation of the static motion area B, the controller 100 may then determine whether a velocity vector of a new motion occurring within the static motion area B is out of the static motion area B, in step S111.

In this case, the new motion may be a motion occurring after the static motion area B is generated, and may include a motion of a dynamic object moving within the static motion area B, in addition to a static object based on which the static motion area B is generated.

Figure 5:
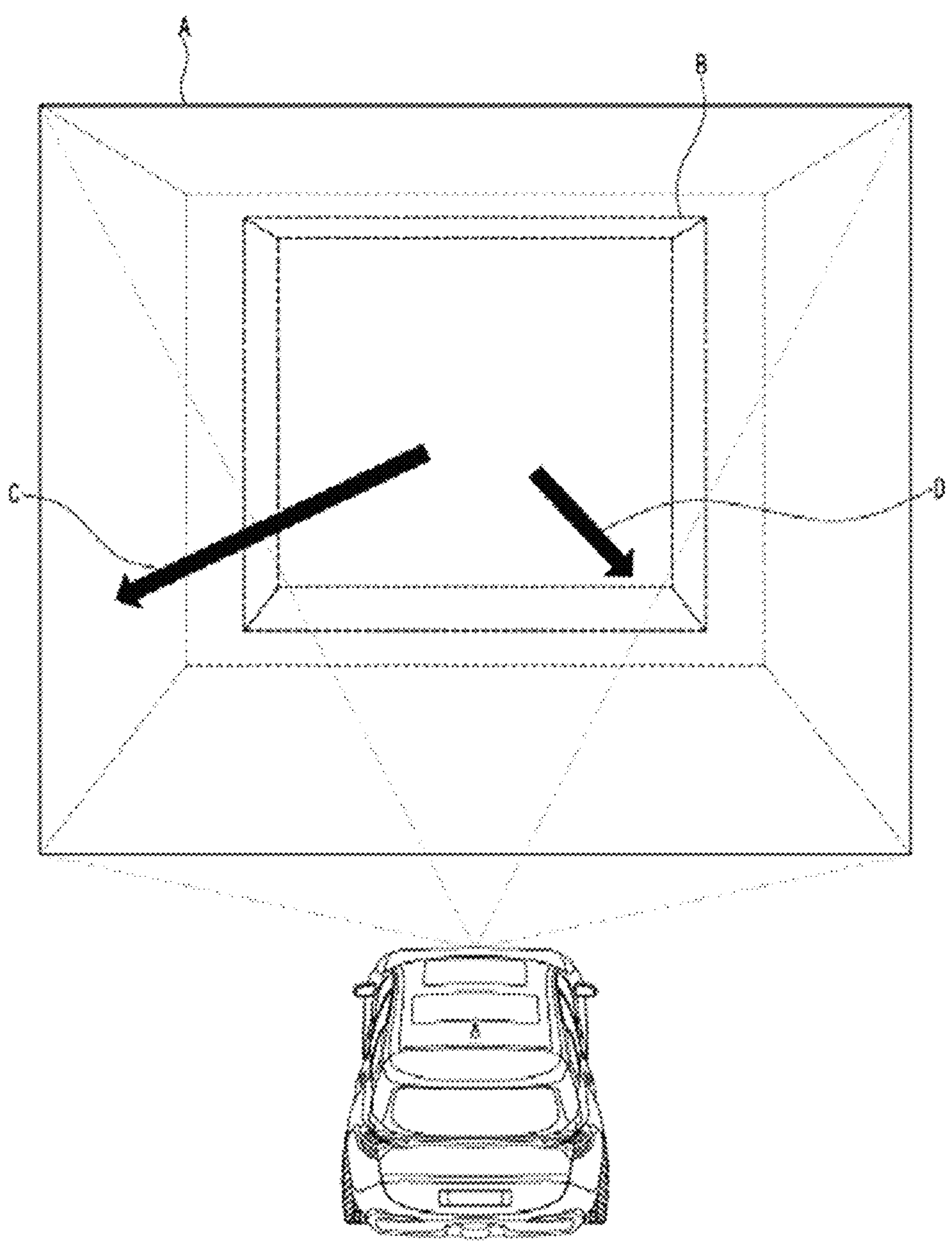
FIG. 5 is a diagram illustrating a velocity vector detected within a static motion area according to an embodiment of the present disclosure.

FIG. 5 is a diagram illustrating a velocity vector detected within a static motion area according to an embodiment of the present disclosure. FIG. 5 illustrates a detection area A and a static motion area B of a motion detection sensor of a vehicle, a velocity vector C that is detected within the static motion area B and is out of the static motion area B, and a velocity vector D that is detected within the static motion area B and is not out of the static motion area B, e.g., a velocity vector within the static motion area B.

When the controller 100 detects a new motion (e.g., the velocity vector C) out of the static motion area B by the second set time, the controller 100 may perform motion detection-based recording (e.g., turn on the video recording function) (Yes in step S111).

However, when no new motion out of the static motion area B occurs by the second set time (No in step S111), the controller 100 may check whether the sensitivity auto-adjustment function is set in step S113.

The sensitivity auto-adjustment function may receive an input from the user through the user menu.

When the sensitivity auto-adjustment function is enabled (ON in step S113), the controller 100 may automatically reduce a detection sensitivity in step S115*a*.

For example, reducing the detection sensitivity may indicate more precisely detecting a motion in an area in a direction close to the vehicle, e.g., in the front of the static motion area B, by excluding the static motion area B from the detection range A of the motion detection sensor (e.g., A-B).

In this case, a motion within the static motion area B may not be detected (e.g., at all) by the sensor.

In contrast, when the sensitivity auto-adjustment function is disabled (OFF in step S113), the controller 100 may maintain the detection in the static motion area B in step S115*b*, unlike step S115*a*.

When the detection range is determined in step S115*a* or S115*b*, the controller 100 may continue to determine whether a new motion C that is out of the static motion area B is recognized in step S117 and, when the motion C out of the static motion area B is recognized (Yes in step S117), may perform the motion detection-based recording (e.g., turn on the video recording function), initialize a static motion area, and perform the steps after S105 again.

In a case where a motion is detected within the static motion area B, but the motion is not the motion C that is out of the static motion area B (No in step S117), e.g., when (e.g., only) a motion D within the static motion area B is recognized, the motion detection-based recording may not be performed (e.g., the video recording function is turned off) in step S119.

As described above, the video recording system of a vehicle according to embodiments of the present disclosure may prevent unnecessary videos or images of motions of static objects from being recorded, thereby efficiently using a memory and performing event recording while the vehicle is parked (e.g., turning on the video recording function) without wasting power of the vehicle.

What is claimed is:

1. A method for controlling a vehicle video recording system of a vehicle, the method comprising:
- receiving, by a controller, a detection signal from at least one sensor mounted at the vehicle that detects a motion of at least one object around the vehicle while the vehicle is in a parked state;
- turning, by the controller, on a video recording function of the vehicle video recording system in response to receiving the detection signal;
- collecting, by the controller, motion information of a first object which makes a continuous motion, for a first set time;
- generating, by the controller, a static motion area based on the motion information of the first object collected during the first set time; and
- in response to determining that a detection signal received from the at least one sensor is generated based on the motion of the first object within the static motion area, turning off, by the controller, the video recording function for the motion of the first object.

2. The method for controlling the vehicle video recording system of claim 1, wherein the motion information comprises:
- at least one of a velocity vector of the first object, a motion occurrence distance at which the motion occurs from the vehicle, and a three-dimensional (3D) coordinate.

3. The method for controlling the vehicle video recording system of claim 1, wherein generating the static motion area comprises
- generating, as the static motion area, an area including an outermost end 3D coordinate of the motion information collected during the first set time.

4. The method for controlling the vehicle video recording system of claim 3, wherein the static motion area is in the form of a 3D hexahedron.

5. The method for controlling the vehicle video recording system of claim 1, further comprising:
- determining whether a motion of the first object is detected outside the static motion area or a motion of a second object is detected; and
- when the motion of the first object is detected outside the static motion area or the motion of the second object is detected, turning on the video recording function.

6. The method for controlling the vehicle video recording system of claim 5, wherein determining whether the motion of the first object is detected outside the static motion area or the motion of the second object is detected is performed during a second set time.

7. The method for controlling the vehicle video recording system of claim 6, wherein the first set time or the second set time is set differently depending on a motion occurrence distance at which the motion occurs.

8. The method for controlling the vehicle video recording system of claim 7, wherein the first set time or the second set time is proportional to the motion occurrence distance.

9. The method for controlling the vehicle video recording system of claim 6, further comprising:
- determining whether a sensitivity auto-adjustment function is enabled when the motion of the first object is not detected outside the static motion area nor the motion of the second object is detected during the second set time.

10. The method for controlling the vehicle video recording system of claim 9, further comprising receiving, through a user menu, an input about whether to enable the sensitivity auto-adjustment function.

11. The method for controlling the vehicle video recording system of claim 9, further comprising excluding the static motion area from a detection range when the sensitivity auto-adjustment function is enabled.

12. A vehicle video recording system for recording videos upon detecting a motion of an object around a vehicle in a parked state, the vehicle video recording system comprising:

a motion detection sensor configured to detect a motion of an object around the vehicle;

a camera configured to record a video of surroundings of the vehicle when the motion is detected through the motion detection sensor;

a memory configured to store the recorded video; and a controller, wherein the controller is configured to:

receive a detection signal from the motion detection sensor that detects a motion of at least one object around the vehicle while the vehicle is in a parked state;

in response to receiving the detection signal, turn on a video recording function of the vehicle video recording system;

collect motion information of a first object which makes a continuous motion, for a first set time;

generate a static motion area based on the motion information of the first object collected during the first set time; and in response to determining that a detection signal received from the motion detection sensor is generated based on the motion of the first object within the static motion area, turn off a video recording function for the motion of the first object.

13. The vehicle video recording system of claim 12, wherein the motion information comprises at least one of a velocity vector of the first object, a motion occurrence distance at which the motion occurs from the vehicle, and a three-dimensional (3D) coordinate.

14. The vehicle video recording system of claim 12, wherein the controller is further configured to generate, as the static motion area, an area including an outermost end 3D coordinate of the motion information collected during the first set time.

15. The vehicle video recording system of claim 12, wherein the controller is further configured to:

determine whether a motion of the first object is detected outside the static motion area or a motion of a second object is detected; and when the motion of the first object is detected outside the static motion area or the motion of the second object is detected, turn on the video recording function.

16. The vehicle video recording system of claim 15, wherein the controller is further configured to determine whether the motion of the first object is detected outside the static motion area or the motion of the second object is detected during a second set time.

17. The vehicle video recording system of claim 16, wherein the first set time or the second set time is set differently depending on a motion occurrence distance at which the motion occurs.

18. The vehicle video recording system of claim 16, wherein the controller is further configured further to determine whether a sensitivity auto-adjustment function is enabled when the motion of the first object is not detected outside the static motion area nor the motion of the second object is detected during the second set time.

19. The vehicle video recording system of claim 18, wherein the controller is further configured to receive, through a user menu, an input about whether to enable the sensitivity auto-adjustment function.

20. The vehicle video recording system of claim 19, wherein the controller is further configured to, when the sensitivity auto-adjustment function is enabled, exclude the static motion area from a detection range of the motion detection sensor.

* * * * *